United States Patent
Weiner

(10) Patent No.: US 11,888,537 B2
(45) Date of Patent: *Jan. 30, 2024

(54) SECURED FIBER LINK SYSTEM

(71) Applicant: APRIORI NETWORK SYSTEMS, LLC., Bedminster, NJ (US)

(72) Inventor: Gary M. Weiner, Bedminster, NJ (US)

(73) Assignee: APRIORI NETWORK SYSTEMS, LLC., Bedminster, NJ (US)

( * ) Notice: Subject to any disclaimer, the term of this patent is extended or adjusted under 35 U.S.C. 154(b) by 251 days.

This patent is subject to a terminal disclaimer.

(21) Appl. No.: 16/384,360

(22) Filed: Apr. 15, 2019

(65) Prior Publication Data

US 2019/0245615 A1 Aug. 8, 2019

Related U.S. Application Data

(63) Continuation of application No. 15/435,619, filed on Feb. 17, 2017, now Pat. No. 10,284,288.

(60) Provisional application No. 62/301,892, filed on Mar. 1, 2016, provisional application No. 62/296,897, filed on Feb. 18, 2016.

(51) Int. Cl.
*H04B 10/85* (2013.01)
*H04L 69/00* (2022.01)

(52) U.S. Cl.
CPC ............. *H04B 10/85* (2013.01); *H04L 69/00* (2013.01)

(58) Field of Classification Search
CPC ...... H04B 10/0705; H04B 10/85; H04L 69/00
See application file for complete search history.

(56) References Cited

U.S. PATENT DOCUMENTS

| | | | |
|---|---|---|---|
| 4,000,416 A | 12/1976 | Goell | |
| 4,062,618 A | 12/1977 | Steensma | |
| 4,134,642 A | 1/1979 | Kapron et al. | |
| 4,217,488 A * | 8/1980 | Hubbard | H04B 10/85 398/189 |
| 4,436,368 A | 3/1984 | Keck | |
| 4,834,484 A | 5/1989 | Gorman et al. | |
| 4,973,169 A * | 11/1990 | Slonecker | G02B 6/274 385/1 |
| 5,140,636 A | 8/1992 | Albares | |
| 5,166,821 A | 11/1992 | Huber | |
| 5,311,604 A * | 5/1994 | Rogner | G02B 6/1221 264/1.36 |

(Continued)

FOREIGN PATENT DOCUMENTS

WO 2016145597 A1 9/2016
WO 2018027267 A1 2/2018

OTHER PUBLICATIONS

Ivan Kaminow, "Optical Fiber Telecommunications", May 11, 2013, Academic Press, pp. 460, 461.*

(Continued)

*Primary Examiner* — Pranesh K Barua
(74) *Attorney, Agent, or Firm* — M&B IP Analysts, LLC.

(57) ABSTRACT

A fiber link system, method and device for masking signals on a fiber link system. The system includes sending a desired sequence of information in the form of a true signal that is typically intended to be transferred between legitimate users at both ends of a link. Sending chaff signals, or subterfuge signals, alongside the true signal to mask such legitimate signals in the fiber cable from intruders tapping into the fiber cable.

13 Claims, 3 Drawing Sheets

(56) References Cited

U.S. PATENT DOCUMENTS

| | | | |
|---|---|---|---|
| 5,448,059 A | 9/1995 | Blank et al. | |
| 5,455,698 A | 10/1995 | Udd | |
| 5,559,623 A | 9/1996 | Einarsson | |
| 5,694,408 A | 12/1997 | Bott et al. | |
| 5,712,937 A | 1/1998 | Asawa et al. | |
| 5,757,912 A * | 5/1998 | Blow | H04L 9/0858 380/256 |
| 6,160,614 A | 12/2000 | Unno | |
| 6,246,500 B1 * | 6/2001 | Ackerman | H04B 10/505 398/115 |
| 6,342,965 B1 * | 1/2002 | Kinoshita | H01S 3/06754 359/334 |
| 6,801,700 B2 * | 10/2004 | MacChesney | G02B 6/02 385/101 |
| 6,850,712 B1 * | 2/2005 | Delavaux | H04B 10/2537 398/183 |
| 7,327,914 B1 | 2/2008 | Kahn et al. | |
| 7,596,322 B2 * | 9/2009 | Tomaru | H04L 9/0662 380/255 |
| 7,613,396 B2 * | 11/2009 | Maeda | H04B 10/70 380/255 |
| 7,639,909 B2 * | 12/2009 | Murshid | B64D 47/02 385/38 |
| 8,184,989 B2 * | 5/2012 | Maeda | H04L 9/0852 380/256 |
| 8,538,272 B1 * | 9/2013 | Robinson | H04B 10/2513 398/158 |
| 8,644,362 B1 * | 2/2014 | Lauer | H04J 13/0018 375/141 |
| 8,798,455 B2 | 8/2014 | Frankel | |
| 9,007,681 B2 | 4/2015 | Zhu | |
| 9,008,507 B2 * | 4/2015 | Winzer | H04B 10/07953 398/44 |
| 9,766,407 B2 | 9/2017 | Weiner et al. | |
| 9,857,536 B2 | 1/2018 | Kopp et al. | |
| 2001/0024307 A1 | 9/2001 | Franco et al. | |
| 2002/0024691 A1 * | 2/2002 | Kajita | H04B 10/079 398/9 |
| 2002/0025041 A1 * | 2/2002 | Tomita | H04L 9/0662 380/256 |
| 2002/0085716 A1 * | 7/2002 | Abdulkader | H04K 1/02 380/205 |
| 2002/0191415 A1 * | 12/2002 | Takei | H01S 3/067 362/551 |
| 2003/0007215 A1 | 1/2003 | Snawerdt | |
| 2003/0030872 A1 * | 2/2003 | Jong | H04B 10/506 398/182 |
| 2003/0128982 A1 * | 7/2003 | Glingener | H04B 10/532 398/65 |
| 2004/0156643 A1 | 8/2004 | Frederiksen et al. | |
| 2004/0184820 A1 * | 9/2004 | Ohishi | H01S 3/06795 398/200 |
| 2004/0208208 A1 * | 10/2004 | Shin | H01S 5/4006 372/32 |
| 2005/0105728 A1 * | 5/2005 | Yamaoka | G06F 21/10 380/202 |
| 2005/0244165 A1 * | 11/2005 | Hofmeister | H04B 10/29 398/155 |
| 2005/0265727 A1 * | 12/2005 | Glingener | H04J 14/06 398/152 |
| 2006/0045525 A1 * | 3/2006 | Lee | H04B 10/25752 398/71 |
| 2006/0093376 A1 * | 5/2006 | Mitchell | H04B 10/70 398/183 |
| 2006/0115086 A1 * | 6/2006 | Beausoleil | G06F 7/588 380/263 |
| 2006/0188262 A1 * | 8/2006 | Suematsu | H04B 10/077 398/147 |
| 2007/0065155 A1 * | 3/2007 | Luo | H04B 10/70 398/141 |
| 2007/0285764 A1 * | 12/2007 | Sugliani | H01S 3/302 359/334 |
| 2008/0025511 A1 * | 1/2008 | Fuse | H04K 1/02 380/256 |
| 2008/0031637 A1 * | 2/2008 | Tomaru | H04B 10/548 398/188 |
| 2008/0310858 A1 * | 12/2008 | Lu | H04B 10/296 398/158 |
| 2009/0016736 A1 * | 1/2009 | Beal | H04L 9/0852 398/144 |
| 2010/0028008 A1 * | 2/2010 | Nakajima | H04B 10/07955 398/83 |
| 2010/0040380 A1 * | 2/2010 | Lewin | G06E 3/00 398/158 |
| 2010/0299517 A1 * | 11/2010 | Jukic | H04L 63/0823 713/193 |
| 2010/0329671 A1 | 12/2010 | Ryf et al. | |
| 2010/0329693 A1 * | 12/2010 | Chen | H04B 10/85 398/147 |
| 2011/0076020 A1 * | 3/2011 | Nilsson | H04B 10/0775 398/65 |
| 2011/0170858 A1 | 7/2011 | Aguren | |
| 2011/0274435 A1 | 11/2011 | Fini et al. | |
| 2011/0279888 A1 * | 11/2011 | Fini | G02B 6/2856 359/334 |
| 2012/0076301 A1 * | 3/2012 | Kanter | H04K 1/02 380/256 |
| 2012/0177065 A1 * | 7/2012 | Winzer | H04B 10/2581 370/480 |
| 2012/0207470 A1 | 8/2012 | Djordjevic et al. | |
| 2012/0263466 A1 | 10/2012 | Djordjevic et al. | |
| 2012/0294625 A1 * | 11/2012 | Dynes | H04L 7/0008 398/155 |
| 2012/0314867 A1 * | 12/2012 | Tomaru | H04L 9/08 380/270 |
| 2013/0063809 A1 | 3/2013 | Nishihara et al. | |
| 2013/0077967 A1 | 3/2013 | Woodward et al. | |
| 2013/0121693 A1 | 5/2013 | Tanaka et al. | |
| 2013/0148963 A1 | 6/2013 | Cvijetic et al. | |
| 2013/0202292 A1 * | 8/2013 | Sokolov | H04B 10/807 398/34 |
| 2013/0236175 A1 | 9/2013 | Sethumadhavan et al. | |
| 2013/0308951 A1 * | 11/2013 | Blumenthal | H04J 14/02 398/83 |
| 2014/0003807 A1 | 1/2014 | Hamaguchi et al. | |
| 2014/0079395 A1 * | 3/2014 | Effenberger | H04B 3/32 398/66 |
| 2014/0153922 A1 | 6/2014 | Ryf et al. | |
| 2014/0168756 A1 | 6/2014 | Zhu | |
| 2014/0186033 A1 * | 7/2014 | Winzer | H04B 10/2581 398/39 |
| 2014/0294345 A1 | 10/2014 | Kopp et al. | |
| 2014/0307304 A1 | 10/2014 | Zhu | |
| 2014/0348506 A1 * | 11/2014 | Nakamoto | H04J 14/0224 398/65 |
| 2015/0117511 A1 * | 4/2015 | Lyubomirsky | H04L 25/03057 375/233 |
| 2015/0304051 A1 * | 10/2015 | Yuan | H04B 10/70 398/188 |
| 2015/0372763 A1 * | 12/2015 | Wang | H04B 10/58 398/81 |
| 2016/0018245 A1 | 1/2016 | Yamate et al. | |
| 2016/0036531 A1 * | 2/2016 | Babic | H01S 5/041 398/187 |
| 2016/0056889 A1 * | 2/2016 | Le Taillandier De Gabory | H04L 25/14 398/16 |
| 2016/0112119 A1 | 4/2016 | Vall-Llosera et al. | |
| 2016/0127073 A1 * | 5/2016 | Ashrafi | H04B 10/516 398/44 |
| 2017/0026175 A1 * | 1/2017 | Zhang | H04L 9/0852 |
| 2017/0104543 A1 * | 4/2017 | Taylor | H04B 10/516 |
| 2017/0279554 A1 * | 9/2017 | Lin | H04B 10/2503 |
| 2018/0159619 A1 | 6/2018 | Weiner | |

(56) References Cited

U.S. PATENT DOCUMENTS

| | | | |
|---|---|---|---|
| 2018/0259737 A1* | 9/2018 | Lee | G02B 6/0219 |
| 2020/0083659 A1 | 3/2020 | Reeves-Hall et al. | |

OTHER PUBLICATIONS

Ivan Kaminow, "Optical Fiber Telecommunications", May 11, 2013, Academic Press, pp. 460, 461 (Year: 2013).*
"Risks and Dangers of Fibre Optic Cables", InfoGuard AG, Switzerland, pp. 1-9.
"Secure High-Speed Connectivity", Adva Optical Networking, Version Jul. 2015, pp. 1-6.
"Wavelogic Encryption Solution", ciena: the network specialist, Nov. 2015, pp. 1-5.
Almeshekah, "Using Deception to Enhance Security: A Taxonomy, Model, and Novel Uses," A Dissertation Submitted to the Faculty of Purdue University, West Lafayette, Indiana, Aug. 2015, pp. 1-171.
Barbosa, et al., "Untappable Key Distribution System: a One-Time-Pad Booster", Jul. 2015, pp. 1-13.
Deloitte, "Tapping of Fibre Networks", 2017, Deloitte Touche Tohmatsu Limited, pp. 1-10.
Dickson, "Secure Pipes: Changing the Expectation of Your Internet Service Providers", Jan. 2015, Copyright Frost & Sullivan, California, pp. 1-8.
Hayashi, et al., "125-um-Cladding 8-Core Multi-Core Fiber Realizing Ultra-High-Density Cable Suitable for O-Band Short-Reach Optical Interconnects", Sumitomo Electric Industries, Ltd.,Th5C.6. pdf, OFC Postdeadline Papers copyright OSA 2015, Japan, pp. 1-3.
Hinderthur, "Layer 1 Encryption in WDM Transport Systems", Slideshow for ADVA Optical Networking, 2014, URL: https://www.slideshare.net/ADVAOpticalNetworking/layer-1-encryption-wdm-transport-systems.
IBM Analytics, White Paper, "The Awakening of Cyber-Threat Analysis: An Intelligence-Driven Solution to Security and Risk", IBM Corporation, Somers, NY, Copyright IBM Corporation 2015, pp. 1-20.
ID Quantique SA, "Securing Your Data in Transit for the Long Term", Switzerland, 2014, pp. 1-39.
ID Quantique White Paper, "Fibre Optic Networks: Your Weakest Link?", Version 1.0, Mar. 2011, Switzerland, pp. 1-9.
Ivan Kaminow, "Optical Fiber Telecommunications: Systems and Networks", 2013, Academic Press, Sixth Edition, pp. 460-461.
Kaminow, et al., "Optical Fiber Telecommunications: Systems and Networks", 2013, Academic Press, Sixth Edition, pp. 460-461.
Kopp, et al., "Pitch Reducing Optical Fiber Array and Multicore Fiber for Space-Division Multiplexing", IEEE, 2013, TuC2.2 (Contributed), pp. 99-100.
Lalli, et al., "Modernized Intrusion Detection Using Enhanced Apriori Algorithm", International Journal of Wireless & Mobile Networks (IJWMN) vol. 5, No. 2, Apr. 2013, pp. 71-80.
Modi, et. al., "Integrating Signature Apriori Based Network Intrusion Detection System (NIDS) in Cloud Computing", 2nd International Conference on Communication, Computing & Security (ICCCS—2012), pp. 905-912.
Network Integrity Systems, Inc., "Enhancing the Deployment and Security of SIPRNET and JWICS Networks Using Intrinsic Fiber Monitoring", Conover, NC, Communications Supply Corporation, Clarksburg, MD, 2007, pp. 1-40.
Office of the Secretary of Defense (OSD), Office of Small Business Programs (OSBP), 18.1 Small Business Innovation Research (SBIR), Proposal Submission Instructions, pp. 1-8.
Oyster Optics, Inc., "Securing Fiber Optic Communications against Optical Tapping Methods", Copyright 2002-2003 Oyster Optics, Inc., New York, pp. 1-20.
Richardson, et al., "Space Division Multiplexing in Optical Fibres", Southampton, UK, pp. 1-19.
Ritter, "Network Encryption", Adva Optical Networking, Sep. 2015, pp. 1-36.
Rozario, "Secure Communication Over Fiber Optic Networks", D Y Patil School of Engg. & Technology, India, Mar. 2016, pp. 1-27.
Simpson, "Advanced Alarmed PDS Technology", Network Integrity Systems, WESCO Distribution, Inc., Pittsburgh, PA., pp. 1-8.
Umoh, et al., "The Vulnerability of Fiber-Optics Communication Systems: The Role of Optical Tapping", Journal of Information Engineering and Applications, ISSN 2224-5782 (print) ISSN 2225-0506 (online) vol. 4, No. 4, 2014, Nigeria, pp. 145-153.
Wu, et al., "Secure Communication in Fiber-Optic Networks", Chapter 11, Princeton, NJ, 2014, pp. 173-183. Emerging Trends in ICT Security. DOI: http://dx.doi.org/10.1016/B978-0-12-411474-6.00011-6.
The International Search Report and The Written Opinion of the International Searching Authority for PCT/US2019/060465, ISA/RU, Moscow, Russia.
The European Search Report and Search Opinion for European Application No. 19884210.6, European Patent Office (EPO), Munich, Germany, dated Jul. 22, 2022.

* cited by examiner

SECURED FIBER LINK SYSTEM

CROSS-REFERENCE TO RELATED APPLICATIONS

This application is a continuation of U.S. patent application Ser. No. 15/435,619, filed Feb. 17, 2017, now allowed, which claims the benefit of U.S. Provisional Application No. 62/296,897 filed on Feb. 18, 2016 and U.S. Provisional Application No. 62/301,892 filed on Mar. 1, 2016, the contents of which are hereby incorporated by reference.

TECHNICAL FIELD

The present disclosure relates generally to optical fiber cables, and more particularly to securing information traversing optical fiber cables.

BACKGROUND

Intruders can tap into optical fiber transmission lines and steal information by bending the fiber to enable reading and interpreting the signal energy escaping from that fiber. While there are other methods of tapping information out of optical fibers, taps based on fiber bending are easy to implement, effective, and can be hard to detect. Tapping valuable data transmitted over the world wide optical fiber infrastructure is a threat to every major industry and government organization and, in particular, larger organizations utilizing multiple facilities. While these organizations may be able to secure optical fiber cables within their own facilities, they generally have much less control over the optical fiber cable links between those facilities.

The vulnerabilities of optical fibers to tapping and, in particular, tapping by bending, leaves many organizations susceptible to data theft. Such data theft could lead to leaking of confidential information, thereby causing harm to the entity transporting data over optical fibers. In the business context, leaking of information such as marketing strategies or developmental technologies may ultimately result in damage to profits. In the governmental context, leaking of information related to national security may endanger the lives of citizens. Existing solutions face challenges in detecting and preventing tapping of optical fibers.

It would be advantageous to provide a solution that would overcome the deficiencies of the prior art.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" may be used herein to refer to a single embodiment or multiple embodiments of the disclosure.

Some embodiments disclosed herein include a system for securing fiber links including: a spatially multiplexing optical fiber, a transmit spatial multiplexer configured to couple a plurality of optical signals into a plurality of spatial paths of the spatially multiplexing optical fiber, at least one optically modulated transmit source, at least one optically modulated chaff source, and a receive spatial multiplexer configured to extract at least one more spatial path from the spatially multiplexing fiber.

Some embodiments disclosed herein also include a fiber terminal including: an optical coupler for interfacing between at least one individual true signal channel and at least one chaff signal channel and an optical cable link, a chaff clock synchronizer configured for clock recovery and/or synchronization, a chaff signal generator configured to drive the chaff channels in synch with the true signal channels, and transceivers configured to convert between electrical input/output signals and optical signals that are transmitted over the optical cable link.

Some embodiments disclosed herein also include a method for securing fiber links reciting: coupling a plurality of optical signals into a plurality of spatial paths of a spatially multiplexing optical fiber, wherein there are at least one optically modulated transmit sources comprising real data and at least one optically modulated chaff source. The method may further include extracting by a receive spatial multiplexer at least one spatial path from the spatially multiplexing fiber.

Embodiments may be further defined where the data streams are at least one of generated at a chaff transmitter in real time, pre-recorded and stored at the chaff transmitter, or generated at the chaff transmitter using a quantum random number generator.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
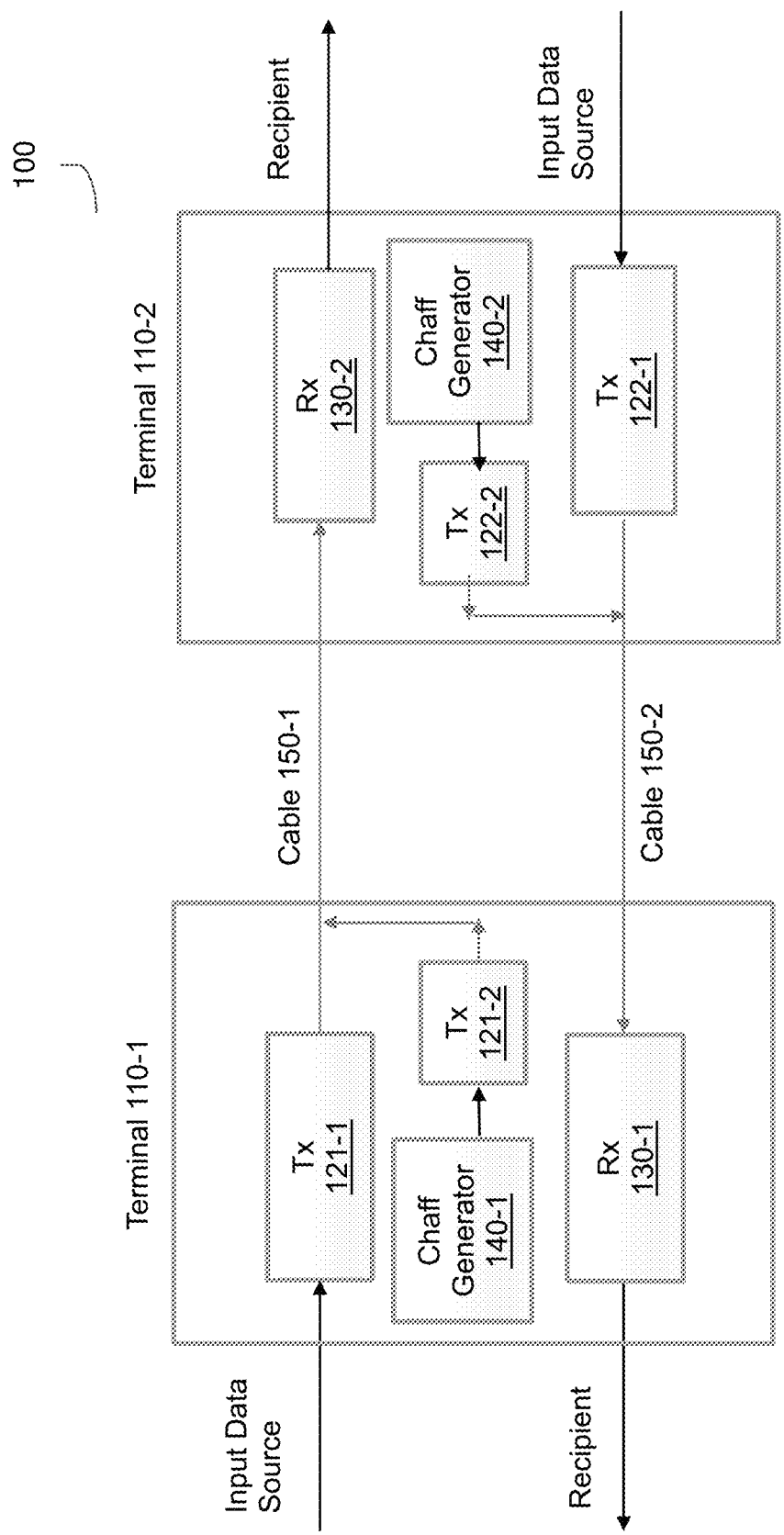
FIG. 1 is a block diagram of a secured fiber link system.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Various disclosed embodiments include a secured or untappable fiber link system that can operate in concert with other measures for protecting or securing transmitted data such as data encryption, patrolling of data lines by guards, intrusion detection monitor sensors, and hardening of data lines by encasing them in concrete or steel conduits.

In an embodiment, the secured fiber link system is configured to allow transparent transmission of data to the intended user while simultaneously making the signal opaque or uninterpretable to an intruder anywhere along the entire link by overwhelming the real information signal with interfering signal energy. In one embodiment, the secured fiber link system is compatible with any contemporary data rates, formats or telecommunications protocols. As such, the disclosed system may be agnostic to new equipment and protocols that will be developed in the future.

According to the disclosed embodiments, the secured fiber link system enables physical security of in-flight data propagating over a secured link by preventing the acquisition of the transmitted real data by an intruder, without corruption to the real data. This is achieved by chaff signals generated at the terminal equipment and transmitted on the optical fiber. The chaff signals may be generated and transmitted whether or not the real data is encrypted. The system is configured to ensure that the intended recipient at the other end of the link receives the real data without receiving the chaff signals or corrupting the real data signal. Encrypting the data stream takes up transmission bandwidth and can introduce latency in the data transmission and even an encrypted signal can be tapped by an intruder. But the secured fiber link system prevents the intruder from acquiring the real data in an unaltered form.

In an embodiment, the secured fiber link system can be used in conjunction with encryption to further secure data transmitted between terminals or can reduce the need for encryption which would in-turn free up considerable transmission bandwidth in the link.

The secured fiber link system sends a desired sequence of information in the form of a first "legitimate" or "true" signal (or set of signals), which is the real signal that is typically intended to be transferred between legitimate users at both ends of a link. Chaff signals, or subterfuge signals, are signals sent alongside the true signal to prevent intruders from misappropriating information being transmitted over a fiber cable by tapping such legitimate signals from a fiber cable.

According to one embodiment, the "true" signals look like chaff signals to an intruder. This is achieved by applying a synchronization or clock recovery technique. In an embodiment, a synchronization technique, discussed in detail below, is utilized to align a chaff signal generator with a signal channel at the transmitter.

An intruder may be any entity that is not the intended recipient of the legitimate signal that attempts to misappropriate information being transmitted over a fiber cable by tapping the cable. The intruder typically attempts to extract data from a fiber cable via mechanical methods such as, e.g., bending, thereby creating scattered or evanescent light energy that may be captured from either the core or cladding of a fiber. Tapping may include, but is not limited to, altering a fiber cable by exerting force on the cable (e.g., by bending the cable) such that the energy of the fibers within the cable is diverted and captured by the intruder.

FIG. 1 shows an exemplary and non-limiting block diagram of a secured fiber link system 100 according to an embodiment. The system 100 includes transceiver terminals 110-1 and 110-2 connected via optical fiber cables 150-1 and 150-2. Each terminal 110-1 or 110-2 includes transmitters 121-1 and 121-2 or 122-1 and 122-2, a receiver 130-1 or 130-2, and a chaff generator 140-1 or 140-2, respectively. Merely by way of example and without limitation on the disclosed embodiments, FIG. 1 will be discussed herein below with respect to transmitting signals from the terminal 110-1 and receiving the signals at the terminal 110-2. Signals may be equally transmitted from the terminal 110-2 and received at the terminal 110-1 without departing from the disclosed embodiments.

The terminal 110-1 transmits and receives signals via the optical fiber cables 150-1 and 150-2, respectively. One or more chaff (i.e., interfering) signals may be generated within the terminal 110-1 and transmitted via the optical fiber cable 150-1 along with the true signal sent by the transmitter 121-1. The chaff signals may be generated within the chaff generator 140-1 or 140-2 and transmitted via the transmitter 121-2 or 121-1. The properties of the chaff signals are "matched" to the true signal at one of the receivers 130-1 or 130-2. The chaff signals are indistinguishable, in terms of data rate, wavelength spectrum, data format and protocol, from the true signal except for the difference in information content.

Tapping the optical fiber cable 150-1 anywhere along the link will result in capturing energy from both the real signal core(s) and from channels carrying chaff signal(s), whereas the intended recipient of the signal information content (at the other end of the link) is not exposed to the chaff signals received at the terminal 110-2. As a result, an intruder tapping into the optical fiber cable 150-1 anywhere along the link between the terminals 110-1 and 110-2 detects a mixture of the chaff and true signals which cannot be distinguished from each other, thereby protecting the data of the true signal from the intruder. At the receivers 130-1 and 130-2, the intended recipient will detect only the true signal without interference from the chaff signal.

It should be noted that only two terminals 110 and two optical fibers 150 are shown in FIG. 1 merely for simplicity purposes and without limitation on the disclosed embodiments. Additional terminals and/or optical fibers may be utilized without departing from the scope of the disclosure.

Figure 2:
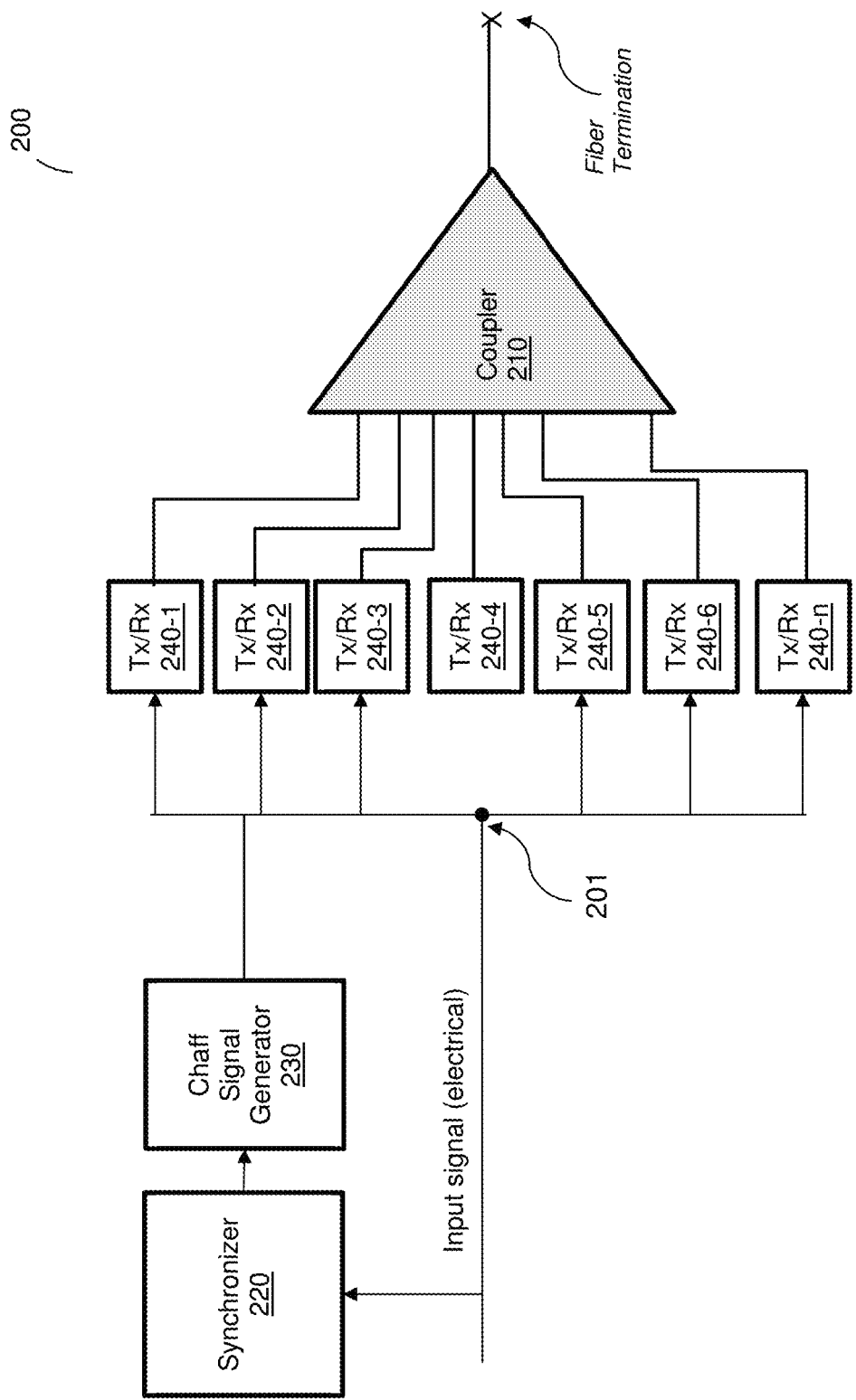
FIG. 2 is a block diagram of a seven-channel multicore fiber.

FIG. 2 is an exemplary and non-limiting schematic diagram of a n-channel multicore fiber terminal 200 according to an embodiment. The terminal 200 includes a coupler 210, a chaff clock synchronizer 220, a chaff signal generator 230, and transceivers 240-1 through 240-$n$ (hereinafter referred to individually as a transceiver (Tx/Rx) 240 and collectively as transceivers 240, merely for simplicity purposes, 'n' is an integer greater than 1). In an embodiment, the n-channel multicore fiber terminal 200 is a 7-channel fiber terminal including 7 transceivers 240.

The coupler 210 may be a bi-directional optical coupler for interfacing between individual true and chaff signal channels and the optical cable link. The coupler 210 is a structure to couple a true signal and at least one or as many as six chaff signals, in this example, into the individual channels of the multicore fiber. The coupler 210 may be, but is not limited to, a lensed fiber based coupler, a tapered glass fiber coupler, a polymer based coupler, and a free space bulk optics coupler. Each signal is transmitted via one of the transceivers 240. The transceivers 240 convert between electrical input/output signals and optical signals that are transmitted over the optical cable link. The coupler 210 and the transceivers 240 may be a transmit spatial multiplexer configured to couple a plurality of optical signals into a plurality of spatial paths of a spatially multiplexing optical fiber from one or more optically modulated transmit sources and one or more optically modulated chaff sources. On the receive side a receive spatial multiplexer may be configured to extract one or more spatial paths from the spatially multiplexing fiber.

In an embodiment, the transceivers 240 operate at or near the same optical wavelength for all channels. In the non-limiting embodiment shown in FIG. 2, the transceiver 240-4 is associated with a channel for transmitting the true signal, and the transceivers 240-1 through 240-3 and 240-5 through 240-$n$ are associated with channels for transmitting chaff signals. In an embodiment, at the junction 201 which is the input to the transceivers, the signal channel is separated from the chaff signals.

The chaff signal generator 230 is configured to drive the chaff channel transceivers in synch with the true signal channel. The chaff-clock synchronizer 220 may be utilized for clock recovery and/or synchronization. In an embodiment, the clock recovery and/or synchronization may be performed at a transmitter such that broadcast chaff signals can synch-up with the signal channel(s). The same basic method can be used for commonly used data rates such as, but not limited to, 1 Gbit/s, 10 Gbit/s, 100 Gbit/s, and the like, and common forms of digital signal formats such as, but not limited to, different forms of on-off keying (OOK), phase shift keying (PSK) and frequency shift keying (FSK).

The waveforms can also follow standard SONET or SDH packet format. The synchronizer 220 is configured to synchronize the chaff signals to appear identical to the true signal except for the information content. In an embodiment, the signal levels of the chaff channel or channels are sufficient to cause a significant degradation of the BER, SNR, and quality of the eye-diagram of the signal received by the intruder relative to that observed by the intended recipient at the other end of the link.

According to certain embodiments, the chaff clock synchronizer 220 and a chaff signal generator 230 can be implemented as a chipset, a microcontroller, a field programmable gate array (FPGA), a programmable logic device (PLD), an application specific integrated circuits (ASIC) or any other type hardware components. In another embodiment, the chaff clock synchronizer 220 and a chaff signal generator 230 can be integrated in an optical transceiver system.

In another embodiment, the transmission (optical) wavelengths of the chaff signal transceivers should be close to that of the signal channel transceiver based on the knowledge of one ordinarily skilled in the art. This is one more potential discriminator between the chaff and signal channels that an intruder may exploit to extract signal information. In an embodiment, the small delta wavelength ensures that the intruder cannot separate the signals and chaff.

The secured fiber link system may provide several advantages such as, but not limited to, protection along the entire length of the link without the need for expensive guards or encasements making installation and security maintenance less expensive (especially on a long link), and increase in bandwidth available for transmitting data due to reduced dependence on data encryption for security.

The chaff signal channels received at the terminal equipment can, however, be used to facilitate intrusion detection and in fact, can be used in conjunction with several existing intrusion detection methods. Thus, a secured fiber link system including the terminal 200 does not impede other security technologies used to prevent intrusion in optical fiber cables.

In an embodiment, the chaff signals may be similar to the true signal in signal protocol/format, (sample) timing, and/or optical wavelength such that both the chaff signals and the true signal will pass through any discriminator, used by an intruder, based on any or all of those signal features. Therefore, given that the chaff signal(s) have sufficient energy, the intruder will be swamped by the chaff information which they cannot separate from the true signal information. Given that the chaff signals are strong enough compared to the true signal along the entire length of the cable, the intrusion defense will be strong everywhere along the cable without the need for additional protection such as cable armament or posting sentries. In another embodiment, the signal and chaff channels may also be utilized for intruder monitoring.

There are a number of modalities within which the secured fiber link system can be effective against fiber tapping. In the first modality, the chaff signals are designed to appear in the same format and synchronized timing (clocking) and wavelength that makes them virtually indistinguishable from the true signal(s), except for their information content. This means that, except for information content, the chaff signals are virtually indistinguishable both spectrally and temporally from the true signals being transmitted. Therefore, the intruder cannot determine that there are signals different from the true signal without prior knowledge about the information content of the true signal.

In a different modality, the chaff signals can be made overwhelmingly strong so that the level of tapped optical energy exceeds the dynamic range of the detector in the intruder's tapping equipment. In this case, there may not be any need to structure the format of the chaff signals as their total power will overwhelm the tapping equipment.

It should be noted that FIG. 2 is described herein above with respect to one true signal and six chaff signals merely for simplicity purposes and without limitation on the disclosed embodiments. More or less chaff signals and additional true signals may be utilized without departing from the scope of the disclosure.

According to various disclosed embodiments, a secured fiber link system may include a transmission medium and chaff or subterfuge signaling, and may be compatible with fiber networks. The transmission medium may be an optical fiber cable in which the transfer of information from a source (sender) is nearly transparent, having a high signal to noise ratio (SNR) and low bit-error-rate (BER), to intended user(s) but is virtually opaque (having low SNR and high BER) to an intruder attempting to tap the cable anywhere along the line.

The chaff or subterfuge signaling enables making the link opaque to intruders. Implemented at the terminal equipment, "synchronizing" the interference data with the desired true signal makes it virtually impossible for the intruders to separate the true signal from the interfering signals without prior knowledge of the true signal. The chaff signals generated at the terminal may be compatible with any current or future transmission formats and protocol. The information content of the chaff signals should be totally uncorrelated with the real data. This can be achieved by, but not limited to, a random data generator or by using a pre-recorded set of data to be transmitted as chaff. Additionally, the secured cable system may be compatible with existing fiber cable infrastructures, thereby allowing seamless integration of the secured cable system into existing infrastructures. Thus, the plurality of optically modulated chaff sources may contain data streams where the data streams may be any combination of one or more of generated at the chaff transmitter in real time, are pre-recorded and stored at the chaff transmitter or are generated at the chaff transmitter using a quantum random number generator.

According to various disclosed embodiments, the transmission medium may include, but is not limited to, any fiber in which multiple, independent information bearing signals can propagate simultaneously. Examples include, but are not limited to, multicore optical fibers where individual signals can propagate in a set of parallel cores and any fiber, including multicore fibers, few mode fibers and multimode fibers, where spatial division multiplexing technology is employed. While the principles of the disclosed embodiments may apply to all of these types of fibers, for the sake of simplicity, the disclosure is discussed with respect to independent signals each propagating in a core of a multicore fiber. It is further assumed that there are at least one or more dedicated channels used to transmit signals in the multicore fiber. Furthermore, it is assumed that there is at least one chaff channel and at least one signal channel propagating in the multicore fiber.

The anti-tapping system being utilized according to various disclosed embodiments, results in protection regardless of how an intruder taps the fiber to attempt signal pilfering. For the current secured system, it is assumed that the chaff and true signal channels can each be coupled selectively into the chaff and true signal channels of the fiber at the transmitter end and selectively coupled out at the other end (receiver) of the link with an appropriate coupler. Such couplers include lensed fiber based couplers, tapered glass fiber couplers, polymer based couplers, and free space bulk optics couplers.

In an example embodiment, the optical fiber medium may have the following properties that both maximize the effectiveness of the anti-tapping capability of the system and do not inhibit the legitimate information transfer between system users: out-coupling efficiency of the true and chaff channels via bending, attenuation of the chaff and true signal channels, and cross-talk between the chaff and true signal channels.

With respect to out-coupling, the fiber medium typically has radial symmetry with respect to its refractive index cross section. This would imply that the out-coupling of light is the same regardless of which way the intruder bends the fiber. Define the symbol p (dB) as the fraction of energy coupled out of the fiber by a tapping mechanism. Then, the following three conditions are possible, with $\rho_{chaff}$ being the energy coupled from the chaff signal(s) and $\rho_{signal}$ being the energy coupled from the true signal(s).

If $\rho_{chaff} > \rho_{signal}$, then the out-coupled chaff signal can overwhelm the out-coupled real signal, however, it may be possible to strip out the chaff signal upstream of the receiver and then tap the real signal downstream with minimal interference from chaff.

If $\rho_{chaff} < \rho_{signal}$, then it is possible for the signal energy tapped out to overwhelm the chaff signal tapped out of the fiber.

If $\rho_{chaff} = \rho_{signal}$, the fiber can be made secured and untappable along its entire length.

In an example embodiment, the first condition is held so that at all points along the fiber the intruder would see a stronger chaff signal contribution than a true signal. However, if the out-coupling of the chaff signal is much larger than that of the true signal, then the chaff signal can be stripped out, thereby exposing the true signal to the intruder further down the link. As a result, in an embodiment, the out-coupling coefficient for both chaff and true signal channels may be nearly equal over the entire length of the cable.

With respect to attenuation, for α (dB/m) being the attenuation per unit length of fiber for chaff and true signal channels, the following conditions are possible, where $\alpha_{chaff}$ is the attenuation for the chaff signal and $\alpha_{signal}$ is the attenuation for the true signal.

If $\alpha_{chaff} > \alpha_{signal}$, then it is possible that after a sufficient distance traveled in the cable link, the chaff signal will be sufficiently weaker than the legitimate signal and there will be no protection of the legitimate data from an intruder tapping into the fiber cable.

If $\alpha_{chaff} < \alpha_{signal}$, then as long as the signal attenuation is acceptable over the link, then adequate chaff protection is possible against an intruder tapping the fiber cable.

If $\alpha_{chaff} = \alpha_{signal}$, then the fiber can be secured along its entire length.

The conclusion is that the signal attenuation must be sufficiently small to ensure good signal quality over the link and that the chaff attenuation must be equal to or smaller than the signal attenuation to enable protection over the entire link.

With respect to crosstalk, for γ (dB/m) being the crosstalk per unit length of fiber between chaff and true signal channels, the following conditions are possible, where $\gamma_{chaff}$ is the crosstalk of the chaff signal and $\gamma_{signal}$ is the crosstalk of the true signal.

If the crosstalk, γ, between chaff channel(s) and the signal channel is significant then this can limit the data transfer along the legitimate signal channel. It may also be easier to tap the fiber as both signal and chaff channels will contain signal information.

According to an embodiment the aggregate optical power of all the optically modulated chaff sources within the optical frequency range substantially occupied by an optically modulated transmit source is chosen such that the ratio of chaff power to transmit signal power coupled out at a fiber bend anywhere along the link is smaller than the required signal-to-noise ratio specified by the transmit signal's corresponding receiver to achieve a desired or maximum error or error-free performance at its output.

According to an embodiment the optical powers of at least one optically modulated chaff source within the optical frequency range substantially occupied by an optically modulated transmit source is chosen such that the ratio of chaff power to transmit signal power coupled out at a fiber bend anywhere along the link is smaller than the required signal-to-noise ratio specified by the transmit signal's corresponding receiver to achieve error-free performance at its output.

According to an embodiment the aggregate optical power of all the optically modulated chaff sources within the optical frequency range substantially occupied by an optically modulated transmit source is chosen such that the chaff optical power coupled out at a fiber bend anywhere along the link is larger than that transmit signal's optical power coupled out at a fiber bend at the same point along the link.

According to an embodiment the optical power of at least one optically modulated chaff source within the optical frequency range substantially occupied by an optically modulated transmit source is chosen such that the chaff optical power coupled out at a fiber bend anywhere along the link is larger than that transmit signal's optical power coupled out at a fiber bend at the same point along the link.

If crosstalk is low between the signal and chaff channels, then the secured fiber link system will be the most effective. Thus, crosstalk should be minimized in the fiber.

Figure 3:
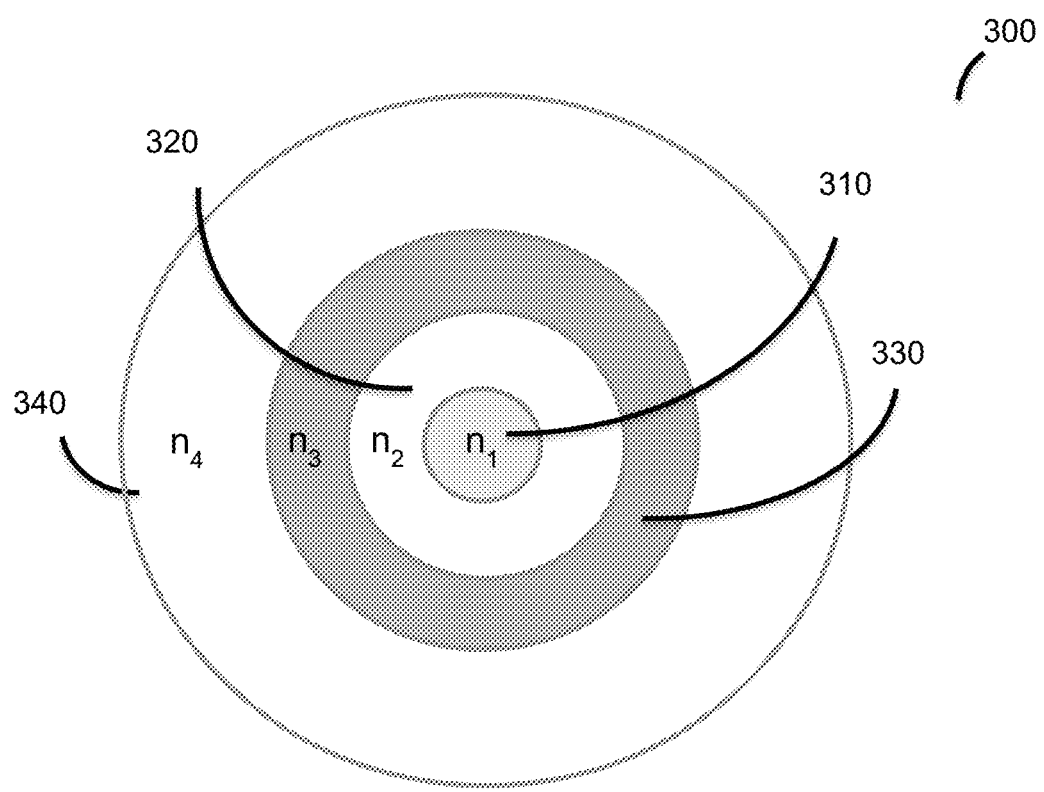
FIG. 3 is a cross-sectional view of a fiber showing a refractive index profile.

FIG. 3 shows an example cross section of an optical fiber 300 showing a refractive index profile according to an embodiment. The fiber includes layer $n_1$ 310, $n_2$ 320, $n_3$ 330, and $n_4$ 340. The relationship between the refractive index of the different layers is: $n_1 > n_2$, $n_3 > n_2$ and $n_3 > n_4$. There is no specific relation between $n_2$ and $n_4$, and these two values may be equal or unequal. In the most basic implementation, the signal may be launched in the center core ($n_1$) 310 and the chaff signal can be launched in the second "ring" core ($n_3$) 330. The other layers, $n_2$ 320 and $n_4$ 340, act as cladding confining the true signals and chaff signals to their respective "cores." The fiber 300 has radial symmetry, which means that it will behave the same when tapped by bending it in any direction.

In an example implementation, the optical fiber 300 may be utilized in a secured fiber link system (e.g., the secured fiber link system 100, FIG. 1) in which a desired sequence of information is transported over the optical fiber. The sequence of information includes a first "legitimate" or "true" signal (or set of signals) that is typically intended to be transferred between legitimate users at both ends of a link. Chaff signals, or subterfuge signals, are signals sent alongside the true signal to prevent intruders from tapping such legitimate signals from a fiber cable. The optical fiber 300 can work in concert with other measures for protecting transmitted data such as data encryption, patrolling of data lines by guards, intrusion detection monitor sensors, and hardening of data lines by encasing them in concrete or steel conduits.

Thus, in an embodiment, the resulting protection is the same regardless of how an intruder applies their fiber bending mechanism. In an embodiment, the chaff and true signal channels can both be coupled selectively into the true signal and chaff signal channels of the fiber 100 at a transmitter end (not shown) and selectively coupled out at another end (e.g., a receiver end, not shown) of the link with an appropriate coupler. Such a coupler may include, but is not limited to, a lensed fiber based coupler, a tapered glass fiber coupler, and a free space bulk optics coupler.

In a typical embodiment, the optical fiber medium should have the following properties that both maximize the effectiveness of the anti-tapping capability of the system and do not inhibit the legitimate information transfer between system users: out-coupling efficiency of the true and chaff channels via bending, attenuation of the chaff and true signal channels, and cross-talk between the chaff and true signal channels.

In an embodiment, the fiber 300 is designed to meet the criteria outlined herein above with respect to out-coupling, attenuation, and cross-talk, for tapping protection while also providing a transmission channel that is equivalent in capacity and performance as standard optical transmission fibers. The fiber 100 combines the simplicity of manufacturing with the added capability of anti-tapping protection in a secure fiber link system. Specifically, in an embodiment, the fiber 100 includes one "true" signal path and one chaff signal path. The fiber 100 is structured using an assembly of concentric, circularly symmetric glass tubes and and/or glass rods. This allows to manufacture the fiber 100 using conventional optical fiber draw technology.

In another embodiment, the core can be single mode, thereby maximizing the bandwidth that the true signal channel can accommodate. The fiber 300 requires the minimum number of transceivers at the terminals of the secure link since it only requires one signal and one chaff channel to provide tapping protection no matter in which direction the fiber is bent by an intruder. A number of commercially available fiber couplers can be used to couple both chaff and true signal channels in to and out of the fiber 300. In an embodiment, the fiber 300 can operate in a system that includes existing mechanisms for detecting intrusion or tampering with the fiber link.

In an embodiment, tapping the fiber 300 anywhere along the link will capture energy from both the intended signal core and from the second ("ring") core carrying chaff signal whereas the intended recipient of the signal information content (at the other end of the link) is not exposed to the chaff signal at the terminal equipment. The chaff signal channels received at the terminal equipment can, however, be used to facilitate intrusion detection and in fact, can be used in conjunction with intrusion detection.

In an embodiment, the chaff signals may be similar to the true signal in signal protocol/format, (sample) timing, and/or optical wavelength such that both the chaff signals and the true signal will pass through any discriminator, used by an intruder, based on any or all of those signal features. Therefore, given that the chaff signal(s) have sufficient energy, the intruder will be swamped by the chaff information which they cannot separate from the true signal information. Given that the chaff signals are strong enough compared to the signal along the entire length of the cable, the intrusion defense will be strong everywhere along the cable without the need for additional protection such as cable armament or posting sentries. In another embodiment, the signal and chaff channels may also be utilized for intruder monitoring.

The untappable fiber system including the optical fiber disclosed herein may provide several advantages such as, but not limited to, protection along the entire length of the link without the need for expensive guards or encasements making installation and security maintenance less expensive (especially on a long link), and increase in bandwidth available for transmitting data due to reduced dependence on data encryption for security.

It should be noted that the various teachings herein are described with respect to particular units of measurement merely for simplicity purposes and without limitation on the disclosed embodiments. For example, the optical transmit source may contain a plurality of wavelength-division multiplexed real signals and the optical chaff source may contain a corresponding plurality of wavelength-division multiplexed optically modulated chaff signals, or more or less than the plurality of wavelength-division multiplexed real signals. In another example the optical transmit source is provided external to the entity providing the optical chaff sources.

In other various embodiments, the optical transmit source is provided external to the entity providing the optical chaff sources. The entity providing the optical chaff sources determines the optical frequency range occupied by one or more externally provided optical transmit sources. The optical frequency range of the optical chaff sources is adapted to the optical frequency range of the externally provided optical transmit sources. The power of the optical chaff sources is adapted according to the optical power of the externally provided optical transmit sources. The power of the one or more optical chaff signals as well as the power of the one or more transmit signals are measured and the ratio of the measured chaff and transmit signal powers are compared to the ratio of launched chaff and transmit signal powers. An alarm is raised if the change of power ratios exceeds a predefined threshold.

It should be noted that the disclosed embodiments can be utilized in alternatively or in conjunction with existing or future fiber cables and/or security systems for preventing tapping or other tampering with fiber cables without departing from the scope of the disclosure.

The various embodiments disclosed herein can be implemented as any combination of hardware, firmware, and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A secured fiber link system, comprising:
    a spatially multiplexing optical fiber;
    a transmit spatial multiplexer configured to couple each of a plurality of optical signals into a respective one of a plurality of distinct spatial paths of the spatially multiplexing optical fiber, each of the spatial paths being able to carry an optical signal;
    at least one optically modulated transmit source coupled to the transmit spatial multiplexer so that an optically modulated signal supplied as an output from the at least one optically modulated transmit source is coupled by the transmit spatial multiplexer into one of the plurality of spatial paths of the spatially multiplexing optical fiber;
    at least one optically modulated chaff source coupled to the transmit spatial multiplexer so that each optically modulated chaff signal supplied as an output from the at least one optically modulated chaff source is coupled by the transmit spatial multiplexer into a respective one of the plurality of spatial paths of the spatially multiplexing optical fiber that are other than the spatial path to which the at least one optically modulated transmit source is coupled, wherein at least one of the at least one optically modulated chaff source occupies substantially a same optical frequency range as at least one of the at least one optically modulated transmit source; and
    a receive spatial multiplexer configured to extract at least one spatial path from the spatially multiplexing fiber;
    wherein at least one of the at least one optically modulated chaff sources contains a data stream; and
    wherein the data stream is pre-recorded and stored at the chaff source.

2. The system of claim 1, wherein the parallel paths carried by the spatially multiplexing optical fiber are nominally uncoupled.

3. The system of claim 1, wherein:
    the spatial multiplexer comprises at least one of a lensed fiber based coupler, a polymer based coupler, or a free space bulk optics coupler,
    each of the at least one optically modulated transmit source is modulated using any one of on-off keying, phase modulation or quadrature amplitude modulation, and
    the spatially multiplexing fiber is a multi-core fiber.

4. The system of claim 1, configured by at least one of:
    at least one of the optically modulated chaff sources employs substantially the same optical modulation format as at least one of the at least one optically modulated transmit source, and
    at least one of the optically modulated chaff sources is temporally synchronized with at least one of the at least one optically modulated transmit source.

5. The system of claim 1, wherein the data stream is generated at the chaff source using a quantum random number generator.

6. The system of claim 1, wherein the receive spatial multiplexer is configured to extract at least one optical signal from the spatially multiplexing optical fiber, wherein the at least one extracted optical signal is detected locally, and wherein the at least one extracted optical signal is made available as a system output.

7. The system of claim 6, wherein a power of the at least one optical chaff signal and a power of the at least one transmit signal are measured, and wherein a ratio of the measured optical chaff and transmit signal powers are compared at the receive spatial multiplexer to a ratio of at least one optical chaff signal power and at least one transmit signal power as measured at the transmit spatial multiplexer.

8. A method for securing a fiber link, comprising:
    coupling a plurality of optical signals into respective ones of a plurality of spatial paths of a spatially multiplexing optical fiber, wherein at least one of the plurality of optical signals is generated by an optically modulated transmit source to contain real data and wherein at least one of the plurality of optical signals is generated by at least one optically modulated chaff source as an optically modulated chaff signal;
    wherein at least the optically modulated chaff signal occupies substantially a same optical frequency range as at least the optical signal that is generated by the optically modulated transmit source; and
    wherein at least one of the at least one optically modulated chaff sources contains a data stream wherein the data stream is pre-recorded and stored at the chaff source.

9. The method of claim 8, further comprising:
    extracting by a receive spatial multiplexer at least one spatial path from the spatially multiplexing fiber.

10. The method of claim 8, wherein:
    at least one of the optically modulated chaff sources employs substantially the same optical modulation format as the optically modulated transmit source, and
    at least one of the optically modulated chaff sources is temporally synchronized with at least the optically modulated transmit source.

11. The method of claim 8, wherein at least one of the at least one optically modulated chaff sources contains a data stream wherein the data stream is generated at the chaff source using a quantum random number generator.

12. The method of claim 8, wherein a ratio of chaff and transmit signal powers measured at a receiver are compared to a ratio of chaff power and transmit signal power measured substantially at the location at which the plurality of optical signals are coupled into the spatially multiplexing fiber.

13. The method of claim 12, further comprising:
triggering an alarm when the comparison indicates that a change of the power ratios has exceeded a predefined threshold.

* * * * *